(12) United States Patent
Yasu et al.

(10) Patent No.: US 11,499,605 B2
(45) Date of Patent: Nov. 15, 2022

(54) SEAL CHAIN

(71) Applicant: TSUBAKIMOTO CHAIN CO., Osaka (JP)

(72) Inventors: Takuya Yasu, Osaka (JP); Makoto Fujiwara, Osaka (JP); Yusuke Nishizawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 837 days.

(21) Appl. No.: 16/340,814

(22) PCT Filed: Oct. 3, 2017

(86) PCT No.: PCT/JP2017/035891
§ 371 (c)(1),
(2) Date: Apr. 10, 2019

(87) PCT Pub. No.: WO2018/083926
PCT Pub. Date: May 11, 2018

(65) Prior Publication Data
US 2021/0285516 A1     Sep. 16, 2021

(30) Foreign Application Priority Data

Nov. 4, 2016  (JP) .............................. JP2016-216156

(51) Int. Cl.
*F16G 13/06*     (2006.01)
*F16J 15/28*     (2006.01)
(52) U.S. Cl.
CPC .............. *F16G 13/06* (2013.01); *F16J 15/28* (2013.01)

(58) Field of Classification Search
CPC ................................ F16G 13/02; F16G 13/06
See application file for complete search history.

(56) References Cited

U.S. PATENT DOCUMENTS

2008/0287237 A1   11/2008   Aoki et al.
2008/0287885 A1   11/2008   Hoffmann et al.
2012/0181148 A1    7/2012   Ueno et al.

FOREIGN PATENT DOCUMENTS

| CN | 101307812 A | 11/2008 | |
| CN | 102583010 A | 7/2012 | |
| EP | 1992838 A2 * | 11/2008 | ............. F16G 13/06 |

(Continued)

OTHER PUBLICATIONS

JP-2009/052624A Machine Translation (Year: 2009).*

(Continued)

*Primary Examiner* — Michael R Mansen
*Assistant Examiner* — Juan J Campos, Jr.
(74) *Attorney, Agent, or Firm* — WHDA, LLP (57) ABSTRACT

A seal chain includes two inner link plates opposed to and spaced apart from each other, a tubular bushing, opposite ends of the bushing being respectively joined to the two inner link plates, a pin rotationally inserted into the bushing, a tubular roller into which the bushing is inserted, the roller being rotationally supported by the bushing, and two outer link plates arranged to externally hold the two inner link plates in between, opposite ends of the pin being respectively joined to the two outer link plates. A recess into which an end of the roller is inserted is formed in an inner surface of each of the inner link plates.

5 Claims, 5 Drawing Sheets (56) References Cited

FOREIGN PATENT DOCUMENTS

| | | | | |
|---|---|---|---|---|
| JP | 2005-282813 | A | 10/2005 | |
| JP | 2008-89032 | A | 4/2008 | |
| JP | 2008-164043 | A | 7/2008 | |
| JP | 2009-047281 | A | 3/2009 | |
| JP | 2009-052624 | A | 3/2009 | |
| JP | 2012-145186 | A | 8/2012 | |
| JP | 2014-152908 | A | 8/2014 | |
| JP | 2015-232352 | A | 12/2015 | |
| KR | 20080101676 | A * | 11/2008 | ............ F16G 13/06 |
| WO | 2007/054233 | A1 | 5/2007 | |

OTHER PUBLICATIONS

JP-2015/232352A Machine Translation (Year: 2015).*
JP-2008/089032 Machine Translation (Year: 2008).*
Office Action dated Apr. 1, 2020, issued in counterpart CN application No. 201780064600.6, with English translation (11 pages).
Office Action dated Aug. 13, 2021, issued in counterpart DE Application No. 11 2017 005 574.1(6 pages).
Sprengring [snap ring]. In: Wikipedia, the free encyclopedia. Editing status: Mar. 12, 2021, 13:35. URL: https://de.wikipedia.org/wiki/Sprengring [retrieved on Aug. 5, 2021]: Cited in DE Office Action dated Aug. 13, 2021. (6 pages).
International Search Report dated Dec. 26, 2017, issued in counterpart International Application No. PCT/JP2017/035891 (1 page).
Office Action dated Apr. 7, 2021, issued in counterpart IN application No. 201947016068, with English translation. (6 pages).

* cited by examiner

SEAL CHAIN

BACKGROUND OF THE INVENTION

The present invention relates to a seal chain having a sealing structure that seals a part between a bushing and a roller.

Patent Document 1 describes a typical example of a seal chain. In such a seal chain, two inner plates and two outer plates are alternately combined with one another by inserting columnar pins into tubular bushings to be rotational relative to each other. The bushings are coupled to the opposite ends of the two inner plates to be non-rotational relative to each other, and the pins are coupled to the opposite ends of the two outer plates to be non-rotational relative to each other. A tubular roller is rotationally coupled to each bushing.

PRIOR ART DOCUMENT

Patent Document

Patent Document 1: Japanese Laid-Open Patent Publication No. 2014-152908

SUMMARY OF THE INVENTION

The above-described seal chain does not particularly include a sealing structure that seals parts between the bushings and the rollers. Thus, the parts between the bushings and the rollers are not sealed in a favorable manner. This will cause lubricant between the bushings and the rollers to easily leak to the outside through a part between the inner surface of each inner plate and the end surface of the roller. In addition, external foreign matter will easily enter the parts between the bushings and the rollers through the part between the inner surface of each inner plate and the end surface of the roller.

It is an objective of the present invention to provide a seal chain that seals a part between a bushing and a roller in a favorable manner.

The means for solving the above-described problem and the advantages will now be described.

A seal chain that solves the above-described problem includes two inner link plates opposed to and spaced apart from each other, a tubular bushing, opposite ends of the bushing being respectively joined to the two inner link plates, a pin rotationally inserted into the bushing, a tubular roller into which the bushing is inserted, the roller being rotationally supported by the bushing, and two outer link plates arranged to externally hold the two inner link plates in between, opposite ends of the pin being respectively joined to the two outer link plates. A recess into which an end of the roller is inserted is formed in an inner surface of each of the inner link plates.

In this structure, when the end of the roller is inserted into the recess, for example, a passage through which lubricant provided between the bushing and the roller reaches the outside is lengthened. This limits the leakage of the lubricant between the bushing and the roller to the outside and limits the entry of external foreign matter into the gap between the bushing and the roller. Accordingly, the part between the bushing and the roller is sealed in a favorable manner.

In the above-described seal chain, it is preferred that a retainer ring be coupled to an outer circumferential surface of the bushing and that an accommodation groove that accommodates the retainer ring be formed in an inner circumferential surface of the roller.

In this structure, when the retainer ring is accommodated in the accommodation groove, the passage through which the lubricant provided between the bushing and the roller reaches the outside is further lengthened. This further limits the leakage of the lubricant between the bushing and the roller to the outside and further limits the entry of external foreign matter into the gap between the bushing and the roller. Accordingly, the part between the bushing and the roller is sealed in a more favorable manner.

In the above-described seal chain, it is preferred that the accommodation groove be formed at a position located away from an engaged portion of the roller engaged with a sprocket.

When the accommodation groove is formed in the roller, the part of the roller where the accommodation groove is formed has a decreased strength. However, the formation of the accommodation groove in the roller causes the roller to engage with the sprocket at parts other than the part having a decreased strength. This limits decreases in the durability of the roller.

In the above-described seal chain, it is preferred that at least part of the accommodation groove be located in the recess.

When the accommodation groove is formed in the roller, the part of the roller where the accommodation groove is formed has a decreased strength. However, the accommodation groove is located away from the engaged part of the roller, which is engaged with the sprocket. This effectively limits decreases in the durability of the roller.

In the above-described seal chain, it is preferred that the retainer ring be annular and have a variable inner diameter.

This structure facilitates installation of the retainer ring.

Effect of the Invention

The present invention allows a part between a bushing and a roller to be sealed in a favorable manner.

DETAILED DESCRIPTION OF THE PREFERRED EMBODIMENTS

A seal chain according to an embodiment will now be described with reference to the drawings.

Figure 1:
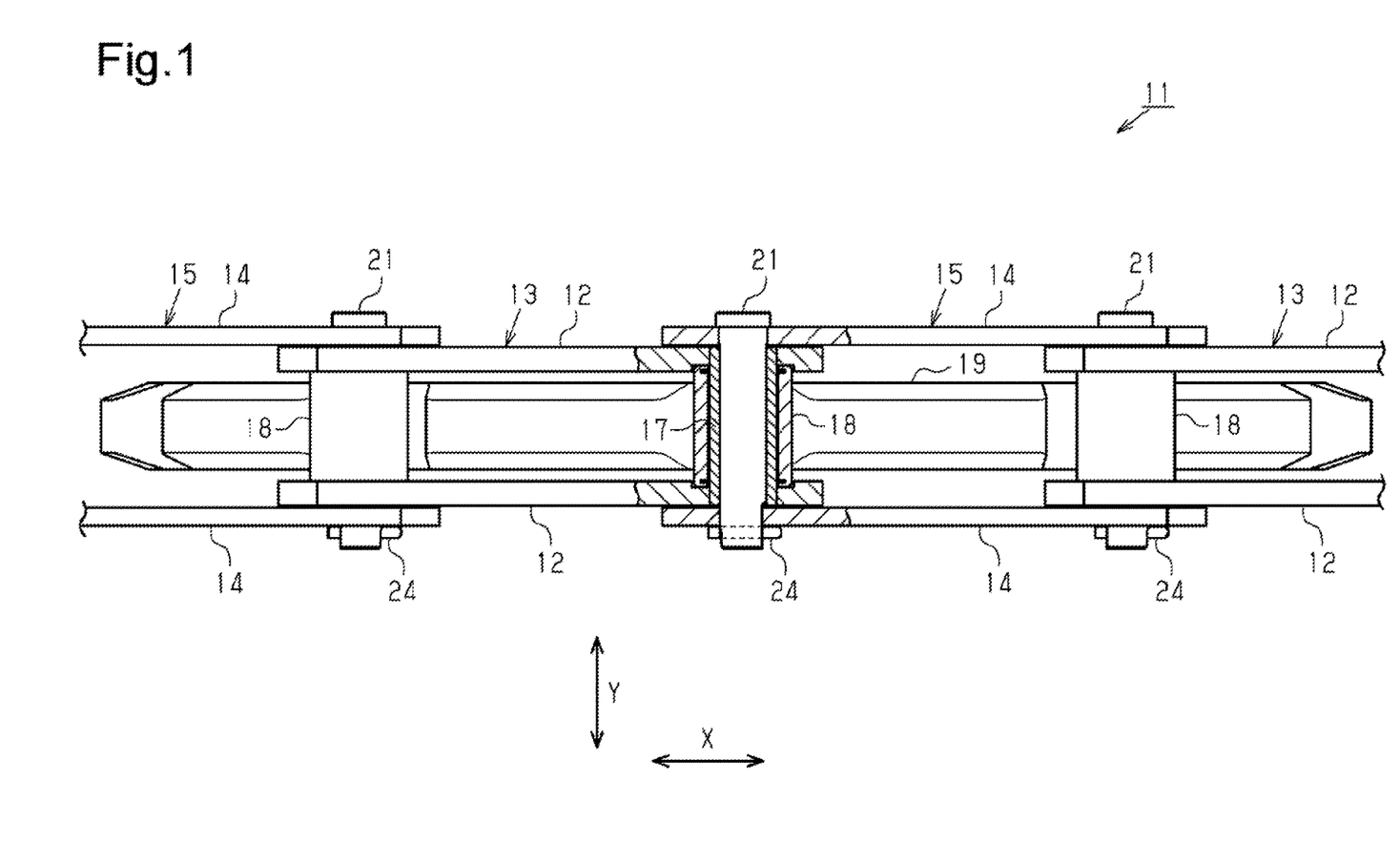
FIG. 1 is a cutaway plan view partially showing a state in which part of a seal chain according to an embodiment is engaged with a sprocket.

Referring to FIG. 1, a seal chain 11 is made of, for example, a steel material and includes inner links 13 and outer links 15. Each inner link 13 includes two inner link plates 12 opposed to and spaced apart from each other in a width direction Y. Each outer link 15 includes two outer link plates 14 arranged to externally hold the two inner link plates 12 in between in the width direction Y.

The inner link plates 12 of each inner link 13 and the outer link plates 14 of each outer link 15 have a substantially rectangular shape extending in a serial arrangement direction X, which is a movement direction when the seal chain 11 is pulled to move from one side in a longitudinal direction orthogonal to the width direction Y. The inner link plates 12 and the outer link plates 14, which are opposed to each other in the width direction Y, are parallel to each other. Thus, the seal chain 11 of the present embodiment is a flat-type chain configured such that the distance between the inner link plates 12 is the same and the distance between the outer link plates 14 is the same at a first end and a second end of each inner link 13 and each outer link 15 in the serial arrangement direction X.

Figure 2:
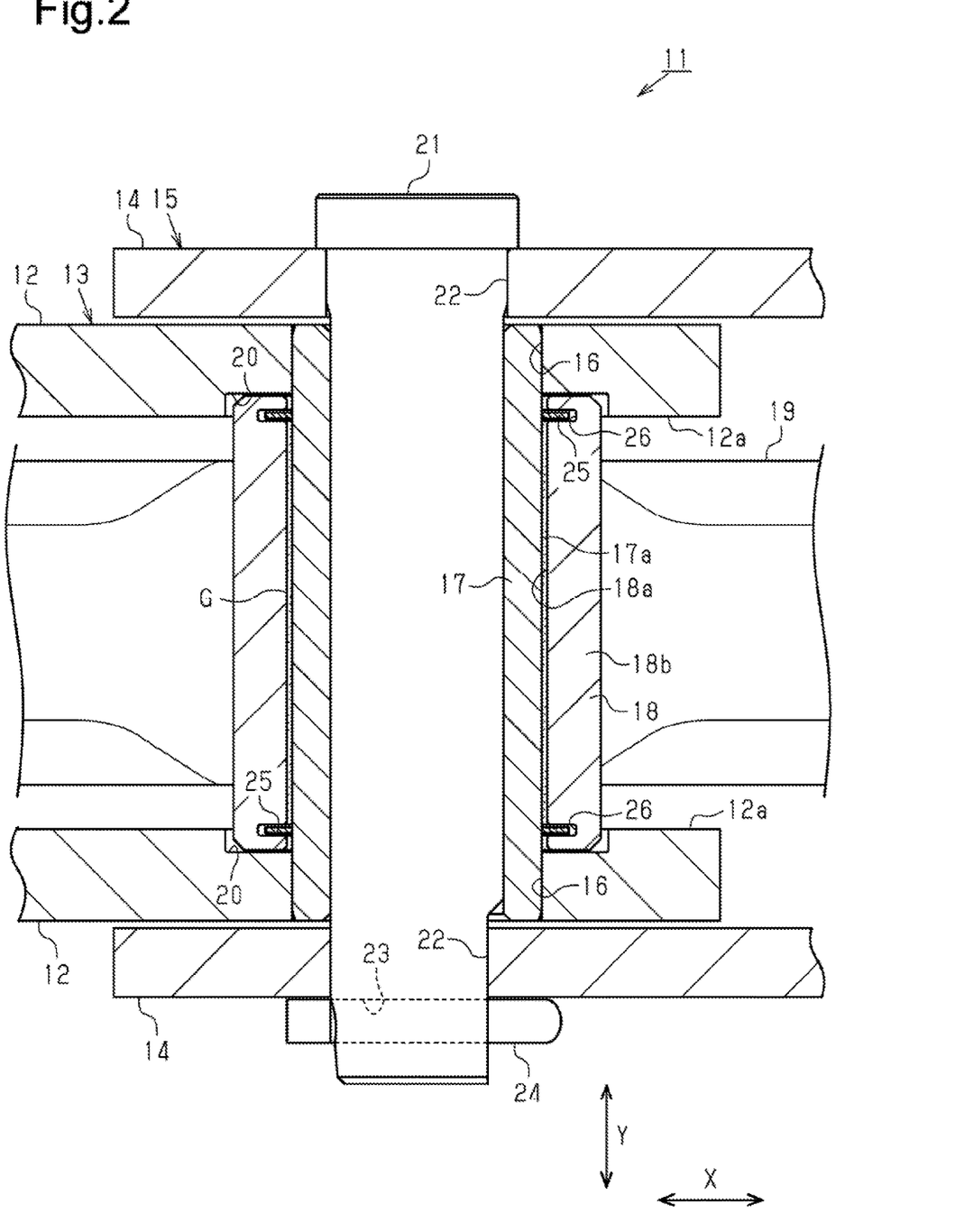
FIG. 2 is an enlarged view showing the main part of FIG. 1.

As shown in FIG. 2, the opposite ends of each inner link plate 12 in the serial arrangement direction X respectively have circular bushing insertion holes 16 extending through the inner link plate 12 in the width direction Y, which is the thickness direction of the inner link plate 12. Two tubular bushings 17 are installed between the two inner link plates 12, which are opposed to each other in each inner link 13, to keep the distance between the two inner link plates 12.

The opposite ends of each bushing 17 are respectively fitted (joined) to the bushing insertion holes 16 of the two inner link plates 12 in a non-rotatable manner. The bushing 17 rotationally supports a tubular roller 18 when the bushing 17 is inserted into the roller 18. That is, the bushing 17 is loosely fitted to the roller 18. The roller 18 is engaged with a sprocket 19.

Each of the two inner link plates 12 includes an inner surface 12a having an annular recess 20 surrounding the bushing insertion hole 16. The opposite ends of the roller 18 are respectively inserted into the recesses 20. In this case, the recess 20, the bushing insertion hole 16, and the roller 18 have the same center axis. Lubricant G is provided between an outer circumferential surface 17a of the bushing 17 and an inner circumferential surface 18a of the roller 18. Grease, solid lubricant (for example, powder graphite or powder molybdenum disulfide is compressed into a tubular shape), or the like can be used as lubricant. In the present embodiment, grease is used as lubricant.

The opposite ends of each outer link plate 14 in the serial arrangement direction X respectively have circular pin insertion holes 22. Columnar pins 21, having a slightly smaller outer diameter than the inner diameter of the bushings 17, are inserted and fitted into the pin insertion holes 22. The pin insertion holes 22 extend through the outer link plate 14 in the width direction Y, which is the thickness direction of the outer link plate 14. The distal end of the pin 21 has a through-hole 23. A retaining pin 24 that restricts the pin 21 from being separated from the pin insertion holes 22 is inserted into the through-hole 23. The distal end of the retaining pin 24 is curved to restrict the retaining pin 24 from being separated from the through-hole 23.

The two outer link plates 14 of each outer link 15 are arranged to externally hold the two inner link plates 12 of the corresponding inner link 13 in between with the bushings 17 installed between the two inner link plates 12. The two outer link plates 14 of the outer link 15 are pivotally coupled to the inner link plates 12 of the inner link 13 by the pin 21. In this case, the opposite ends of the pin 21 are fitted (joined) to the pin insertion holes 22 of the two outer link plates 14 of the outer link 15 in a non-rotatable manner in a state in which the intermediate portion other than the opposite ends of the pin 21 are rotationally inserted into the bushings 17, which are installed between the two inner link plates 12 of the inner link 13.

Thus, the opposite ends of the pin 21 respectively extend through the two outer link plates 14. Further, the inner link plates 12 of each inner link 13 and the outer link plates 14 of each outer link 15, which are adjacent to each other in the serial arrangement direction X, are pivotally coupled to each other by the pin 21 and the bushings 17 at the ends in the serial arrangement direction X.

Figure 3:
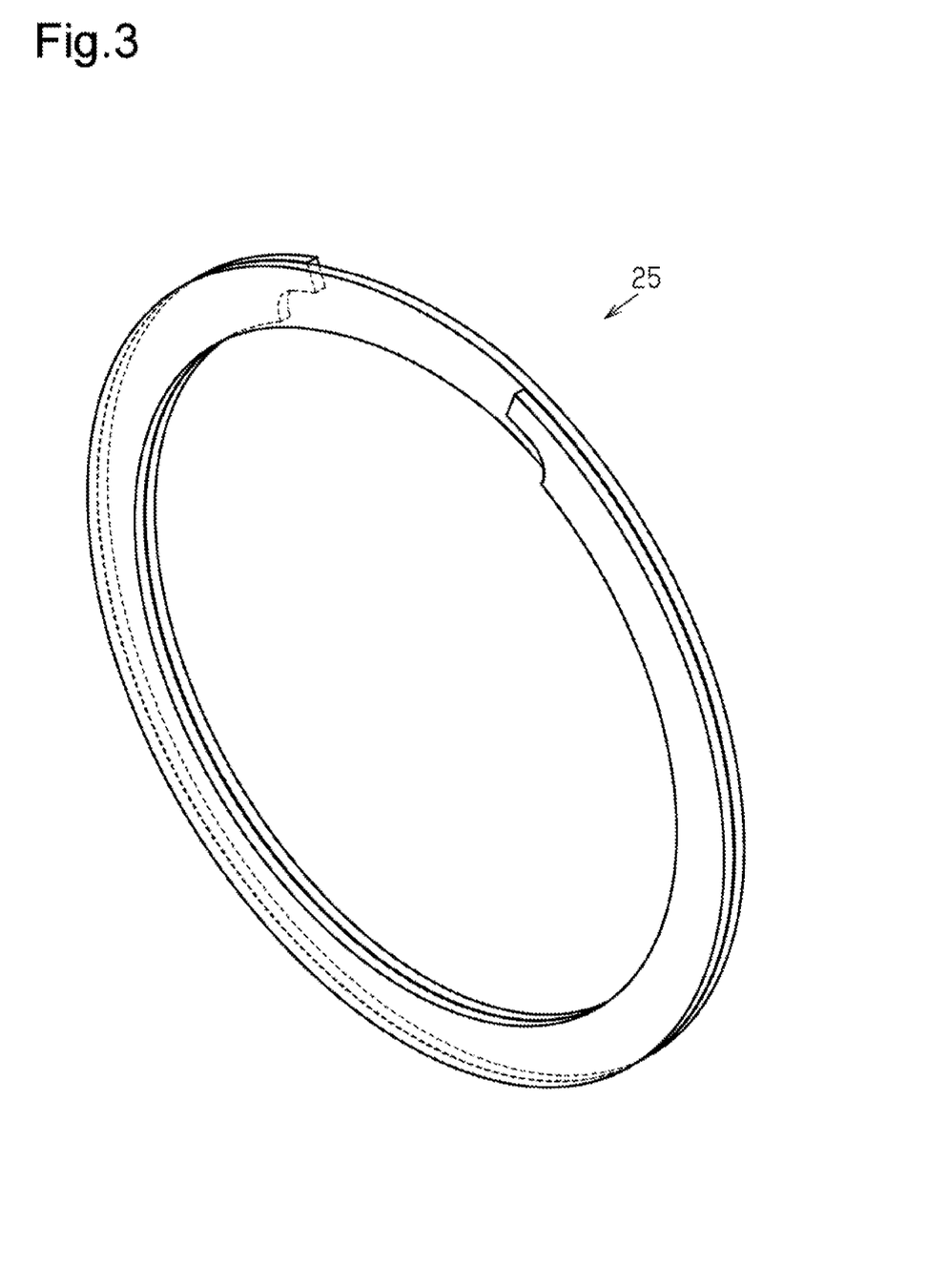
FIG. 3 is a perspective view showing a retainer ring.

An annular retainer ring 25 is installed at a position that substantially corresponds to each recess 20 in the outer circumferential surface 17a of the bushing 17. As shown in FIG. 3, a double-wound retainer ring configured by doubly winding a flat wire made of stainless steel is used as the retainer ring 25 of the present embodiment. The retainer ring 25 is elastically deformable such that its inner diameter is variable. The inner diameter of the retainer ring 25 is set to be slightly smaller than the outer diameter of the bushing 17. In the present embodiment, the bushing 17 is press-fitted to the retainer ring 25 to elastically deform the retainer ring 25 while increased in diameter. The retainer ring 25 is coupled to the bushing 17 in this manner. Thus, the elastic resilient force of the retainer ring 25 allows the retainer ring 25 to be tightly fitted to (pressed against) the bushing 17.

An annular accommodation groove 26 is formed at a position corresponding to the retainer ring 25 in the inner circumferential surface 18a of the roller 18. The accommodation groove 26 accommodates the retainer ring 25, which is coupled to the bushing 17. In this case, part (approximately half in the present embodiment) of the accommodation groove 26 is located in the recess 20. That is, the accommodation groove 26 is formed in each of the opposite ends of the roller 18, which are located away from an engaged part 18b of the roller 18 engaged with the sprocket 19.

Figure 4:
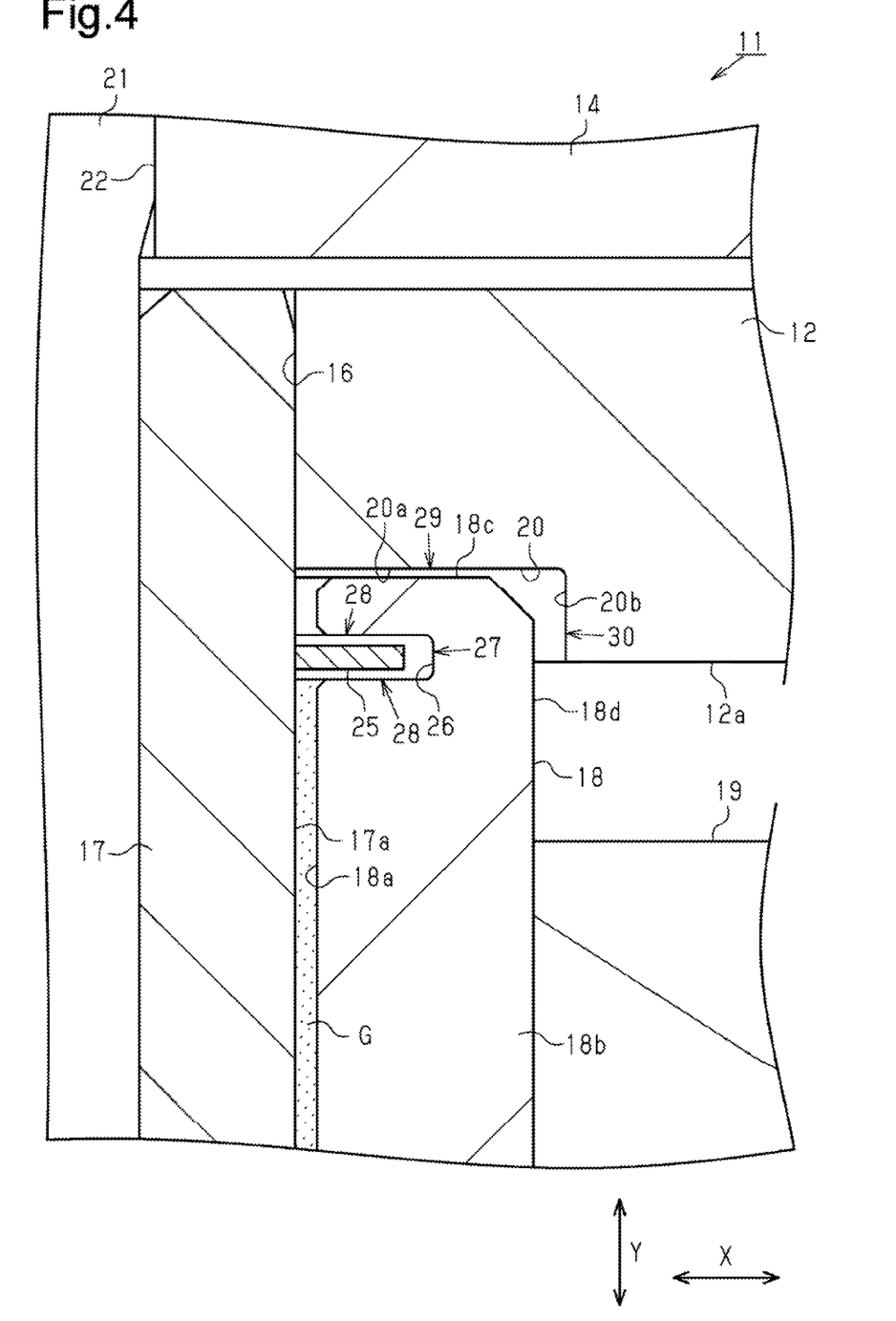
FIG. 4 is an enlarged view showing the main part of FIG. 2.

As shown in FIG. 4, slight gaps are formed between the retainer ring 25 and the accommodation groove 26. In this case, a gap between the accommodation groove 26 and the retainer ring 25 in a radial direction of the retainer ring 25 (direction orthogonal to the width direction Y) is referred to as a first gap 27, and two gaps between the retainer ring 25 and the accommodation groove 26 in the width direction Y are referred to as second gaps 28. In the present embodiment, the first gap 27 is set to be larger than the second gaps 28.

Additionally, slight gaps are formed between the roller 18 and the recess 20. In this case, a gap between an end surface 18c of the roller 18 and a bottom surface 20a of the recess 20 is referred to as a third gap 29, and a gap between an outer circumferential surface 18d of the roller 18 and a side surface 20b of the recess 20 is referred to as a fourth gap 30.

The operation of the seal chain 11 will now be described.

When the sprocket 19 is rotated in a state in which the seal chain 11 is engaged with the sprocket 19, the seal chain 11 is moved so that a part between the roller 18 and the bushing 17 is lubricated by the lubricant G. Although this causes the lubricant G between the roller 18 and the bushing 17 to flow toward the end of the roller 18, the flow of the lubricant G is mostly stopped by the retainer ring 25. Also, this causes some of the lubricant G to flow through the first gap 27 and the second gaps 28, which are the gaps between the retainer ring 25 and the accommodation groove 26, toward the third gap 29 while turning around the retainer ring 25. However, the first gap 27 and the second gaps 28 form narrow curved passages and thus act as labyrinth seals that perform sealing by limiting the passage of the lubricant G.

Thus, a small amount of the lubricant G flows toward the third gap 29 through the first gap 27 and the second gaps 28, which are the gaps between the retainer ring 25 and the accommodation groove 26. This causes the small amount of the lubricant G that has flowed toward the third gap 29 to flow to the outside through the third gap 29 and the fourth gap 30, which are the gaps between the roller 18 and the recess 20. However, the third gap 29 and the fourth gap 30 form narrow curved passages and thus act as labyrinth seals that perform sealing by limiting the passage of the lubricant G. Accordingly, an extremely small amount of the lubricant G flows to the outside through the third gap 29 and the fourth gap 30, which are the gaps between the roller 18 and the recess 20.

In this manner, the seal chain 11 of the present embodiment includes the two labyrinth structures (labyrinth seals) arranged halfway in a passage through which the lubricant G provided between the outer circumferential surface 17a of the bushing 17 and the inner circumferential surface 18a of the roller 18 reaches the outside. As a result, the passage is lengthened. Thus, the part between the outer circumferential surface 17a of the bushing 17 and the inner circumferential surface 18a of the roller 18 is sealed in a favorable manner. This effectively limits the leakage of the lubricant G between the outer circumferential surface 17a of the bushing 17 and the inner circumferential surface 18a of the roller 18 to the outer side. This also limits the entry of external foreign matter into the gap between the outer circumferential surface 17a of the bushing 17 and the inner circumferential surface 18a of the roller 18.

The embodiment described above in detail has the following advantages.

(1) In the seal chain 11, the inner surface 12a of each inner link plate 12 has the recess 20, into which the end of the roller 18 is inserted. Thus, when the end of the roller 18 is inserted into the recess 20, a labyrinth structure is formed halfway in the passage through which the lubricant G provided between the bushing 17 and the roller 18 reaches the outside. As a result, the passage is lengthened. This limits the leakage of the lubricant G between the bushing 17 and the roller 18 to the outside and limits the entry of external foreign matter into the gap between the bushing 17 and the roller 18. Accordingly, since the part between the bushing 17 and the roller 18 is sealed in a favorable manner, the lubricant G is kept for a long period. This consequently contributes to extension of the life of the seal chain 11.

(2) In the seal chain 11, the retainer ring 25 is coupled to the outer circumferential surface 17a of the bushing 17, and the accommodation groove 26 accommodating the retainer ring 25 is formed in the inner circumferential surface 18a of the roller 18. Thus, when the retainer ring 25 is accommodated in the accommodation groove 26, an additional labyrinth structure is formed halfway in the passage through which the lubricant G provided between the bushing 17 and the roller 18 reaches the outside. As a result, the passage is further lengthened. This further limits the leakage of the lubricant G between the bushing 17 and the roller 18 to the outside and further limits the entry of external foreign matter into the gap between the bushing 17 and the roller 18. Accordingly, the part between the bushing 17 and the roller 18 is sealed in a more favorable manner.

(3) When the accommodation groove 26 is formed in the roller 18, the part of the roller 18 where the accommodation groove 26 is formed usually has a decreased strength. In the seal chain 11 of the present embodiment, the accommodation groove 26 is formed at the position located away from the engaged part 18b of the roller 18, which is engaged with the sprocket 19. Thus, the formation of the accommodation groove 26 in the roller 18 causes the roller 18 to engage with the sprocket 19 at parts other than the part having a decreased strength. This limits decreases in the durability of the roller 18.

(4) When the accommodation groove 26 is formed in the roller 18, the part of the roller 18 where the accommodation groove 26 is formed usually has a decreased strength. In the seal chain 11 of the present embodiment, the accommodation groove 26 is partially located in the recess 20. This allows the accommodation groove 26 to be located away from the engaged part 18b of the roller 18, which is engaged with the sprocket 19. This effectively limits decreases in the durability of the roller 18.

(5) In the seal chain 11, the retainer ring 25 is annular and has a variable inner diameter. Thus, after the retainer ring 25 is arranged in the accommodation groove 26, the bushing 17 can be press-fitted to the retainer ring 25. This facilitates installation of the retainer ring 25.

(6) In the seal chain 11, the recess 20 and the roller 18 form a sealing structure (labyrinth structure) for the lubricant G in a non-contact manner.

Further, the retainer ring 25 and the accommodation groove 26 form a sealing structure (labyrinth structure) for the lubricant G in a non-contact manner. Thus, since rotation of the roller 18 is not prevented by the sealing structures (labyrinth structures) for the lubricant G, the roller 18 can be smoothly rotated during use of the seal chain 11.

(7) In the seal chain 11, the first gap 27 is set to be larger than the second gaps 28. Thus, when the seal chain 11 is stretched in the serial arrangement direction X due to wearing between the pin 21 and the bushing 17, the stretching is absorbed by the first gap 27. This restricts the edge of the retainer ring 25 from contacting the bottom surface of the accommodation groove 26.

(8) In the seal chain 11, an oil seal or a mechanical seal is not used for the sealing structure for the lubricant G. This simplifies the sealing structure for the lubricant G.

Modifications

The above-described embodiment may be modified as follows.

Figure 5:
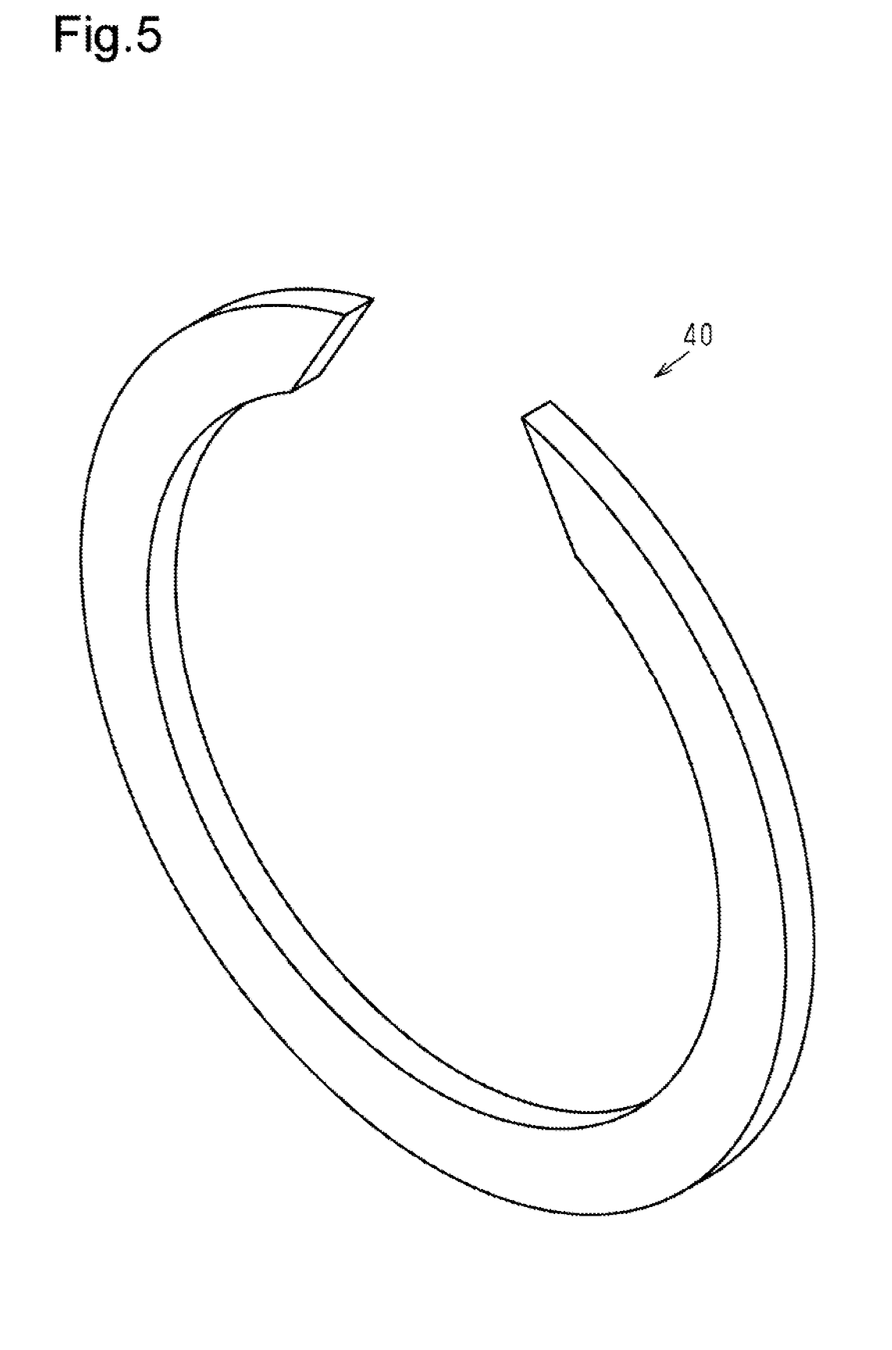
FIG. 5 is a perspective view showing a retainer ring in a modification.

The retainer ring 25 may be changed to a C-shaped retainer ring 40, which is not annular, as shown in FIG. 5.

The retainer ring 25 may be changed to a retainer ring having an invariable inner diameter.

It is preferred that at least part of the accommodation groove 26 be located in the recess 20. Instead, the entire accommodation groove 26 may be located in the recess 20.

The accommodation groove 26 does not necessarily have to be formed in the position located away from the engaged part 18b of the roller 18, which is engaged with the sprocket 19. That is, the accommodation groove 26 may be formed in the engaged part 18b of the roller 18, which is engaged with the sprocket 19.

In the seal chain 11, the retainer ring 25 and the accommodation groove 26 may be omitted.

The seal chain 11 may be an offset-type chain. In the offset-type chain, links curved such that the width of first ends of opposing two link plates are narrower than second ends of the two link plates in the serial arrangement direction X are pivotally coupled to one another by the bushing 17 and the pin 21.

DESCRIPTION OF REFERENCE CHARACTERS

11) Seal Chain; 12) Inner Link Plate; 14) Outer Link Plate; 17) Bushing; 18) Roller; 18b) Engaged Portion; 19) Sprocket; 20) Recess; 21) Pin; 25) Retainer Ring; 26) Accommodation Groove; G) Lubricant

The invention claimed is:

1. A seal chain comprising:

two inner link plates opposed to and spaced apart from each other;

a tubular bushing, opposite ends of the bushing being respectively joined to the two inner link plates;

a pin rotationally inserted into the bushing;

a tubular roller into which the bushing is inserted, the roller being rotationally supported by the bushing; and two outer link plates arranged to externally hold the two inner link plates in between, opposite ends of the pin being respectively joined to the two outer link plates, wherein a recess into which an end of the roller is inserted is formed in an inner surface of each of the inner link plates, wherein a retainer ring is coupled to an outer circumferential surface of the bushing, an accommodation groove that accommodates the retainer ring is formed in an inner circumferential surface of the roller, the two inner link plates are opposed to and spaced apart from each other in a width direction, the two outer link plates are arranged to externally hold the two inner link plates in between in the width direction, a first gap is formed between the retainer ring and the accommodation groove in a radial direction of the retainer ring, and second gaps are formed between the retainer ring and the accommodation groove in the width direction.

2. The seal chain according to claim 1, wherein the accommodation groove is formed at a position located away from an engaged portion of the roller engaged with a sprocket.

3. The seal chain according to claim 2, wherein at least part of the accommodation groove is located in the recess.

4. The seal chain according to claim 1, wherein the retainer ring is annular and has a variable inner diameter.

5. The seal chain according to claim 1, wherein the first gap is larger than the second gaps.

* * * * *